(12) United States Patent
Albonico et al.

(10) Patent No.: US 9,599,878 B2
(45) Date of Patent: Mar. 21, 2017

(54) PERIPHERALLY CONTROLLABLE TIME-LAPSE PHOTOGRAPHY DEVICE

(71) Applicant: Alpine Labs, LLC, Menlo Park, CA (US)

(72) Inventors: Marcus Albonico, Menlo Park, CA (US); Kris Cheng, Hillsborough, CA (US); Jonathan Denby, Los Altos, CA (US); Stephen Hibbs, Boulder, CO (US); Kevin Ting, Mountain View, CA (US)

(73) Assignee: Alpine Laboratories, LLC, Boulder, CO (US)

( * ) Notice: Subject to any disclaimer, the term of this patent is extended or adjusted under 35 U.S.C. 154(b) by 1 day.

(21) Appl. No.: 14/317,802

(22) Filed: Jun. 27, 2014

(65) Prior Publication Data
US 2015/0078737 A1 Mar. 19, 2015

Related U.S. Application Data

(60) Provisional application No. 61/841,325, filed on Jun. 29, 2013.

(51) Int. Cl.
| | |
|---|---|
| G03B 19/02 | (2006.01) |
| G03B 17/56 | (2006.01) |
| G03B 17/40 | (2006.01) |
| G05D 3/00 | (2006.01) |
| F16M 11/00 | (2006.01) |

(52) U.S. Cl.
CPC ......... *G03B 19/026* (2013.01); *F16M 11/00* (2013.01); *G03B 17/40* (2013.01); *G03B 17/561* (2013.01); *G03B 17/568* (2013.01); *G05D 3/00* (2013.01)

(58) Field of Classification Search
USPC ............................................. 396/48
See application file for complete search history.

(56) References Cited

U.S. PATENT DOCUMENTS

| | | | |
|---|---|---|---|
| 6,088,527 A | 7/2000 | Rybczynsk | |
| 6,264,330 B1 | 7/2001 | Walton et al. | |
| 8,244,117 B2 | 8/2012 | Neith | |
| 8,416,321 B2 * | 4/2013 | Nakase | ........ 348/231.5 |
| 2006/0064273 A1 | 3/2006 | Sugiura et al. | |
| 2009/0309986 A1 | 12/2009 | Mayer | |
| 2012/0288269 A1 * | 11/2012 | Jensen | ............ 396/428 |
| 2013/0221795 A1 * | 8/2013 | Hata | ........ 310/216.131 |

FOREIGN PATENT DOCUMENTS

| | | |
|---|---|---|
| JP | 4195606 | 12/2002 |
| JP | 2004101762 | 4/2004 |
| JP | 2002357249 | 12/2008 |
| WO | WO2013085399 | 6/2013 |

\* cited by examiner

*Primary Examiner* — Clayton E Laballe
*Assistant Examiner* — Dennis Hancock
(74) *Attorney, Agent, or Firm* — Rocky Mountain Patent, LLC

(57) ABSTRACT

The preferred embodiment of the invention comprises a motion time-lapse photography device. The device includes an outer enclosure, base, motor, controlling circuitry, stepper-motor, a plurality of gears, a backlash mitigation membrane, and an external interface panel. Embodiments of the motion time-lapse photography device enable the capture of a sequence of photographs at an interval in coordination with axial movement in at least one rotational degree of freedom of a photographic capture device attached to the motion time-lapse photography device.

16 Claims, 15 Drawing Sheets

PERIPHERALLY CONTROLLABLE TIME-LAPSE PHOTOGRAPHY DEVICE

CROSS-REFERENCE TO RELATED APPLICATIONS

This application claims the benefit of U.S. Provisional Application 61/841,325, filed Jun. 29, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Photography as an art form developed over the course of time from the simple viewing and drawing box known as the Camera Obscura in the 1500s, sometimes contained in a full sized room. Later, in the 1800s, the recording of images became a reality by means of photosensitive chemical emulsion layers. In the more recent decades, digital technologies enabled the capture and storage of images on digital media.

As photographic technology advanced, further attainability and functionality developed. What began as a privilege of the wealthy made way for affordable visual documentation for the masses. This also led to further development of motion pictures, series of still photographs captured and replayed in rapid succession to create the visual sensation of motion. The field of photography has recently experienced great advances related to methods and inventions related to the actual recording of images.

One fusion of still photograph technologies and motion picture technologies consists of the capture of a great number of still photographs over a relatively long period of time. Subsequently, playback in the form of a motion picture can take place by displaying the photographs in rapid succession at varying rates. While at times playback can take place at a rate of fifteen frames per second or lower, playback typically takes place at least twenty four frames per second to enable visualization of a full scope movement over a long time period in a relatively short time frame. The capture of such motion related subject matter that otherwise occurs over the course of a long time-period for subsequent display within a condensed time frame is commonly referred to as time-lapse photography.

Time-lapse photography enabled viewers of images produced and displayed as a result of associated methods to see action in what once appeared as static over short time intervals. For instance, at a glance, a viewer may perceive the blooming of a flower or the dynamic movement of the stars as unremarkable or motionless. However, by condensing the playback of images related to such subject matter obtained through time-lapse photography, a viewer of the condensed playback can more clearly perceive the associated movement. Furthermore, time-lapse photography enables the user to capture much higher definition images as each frame is a fully-exposed image. This provides for a potentially higher resolution than other forms of video capture.

Similar to video capture, many users prefer the ability to provide additional motion to the images during the sequence of image capture. Such motion may comprise of tracking, panning, tilting, zooming, or a coordination of at least two of such motions. Tracking, characterized by transversal movement of the camera, typically moves the camera along a substantially linear path. Panning, characterized by a rotational movement of the camera, typically rotates the camera about a fixed axis while maintaining a consistent horizon orientation. Tilting, characterized by a rotational movement of the camera, typically rotates the camera about a fixed axis while maintaining a constant vertical orientation. Zooming, characterized by a dynamic change of focal length, maintains a camera body orientation while changing the focal length, typically changes the focal length in a substantially consistent manner. Sometimes users of video cameras found it advantageous and more desirable to provide motion to the camera to follow a subject or convey a larger view of a landscape. In the same manner, users sometimes find it more desirable to provide motion in conjunction with time-lapse photography sequence captures to create a feeling that the viewer is moving during the time-lapse. This motion time-lapse photography effect is added to provide both functional and aesthetic improvements to the footage, to enable a user to film a larger viewing area during the capture of said footage, as opposed to the use of a static camera position during the capture of said footage that only enables a user to capture a limited subsection of the environment. However, it is not feasible to provide such motion to a camera without specialized equipment to provide discrete and consistent control over the length of the time-lapse sequence capture.

The use of time-lapse and motion time-lapse photography began in the late nineteenth century. Still, until very recently, motion time-lapse photography has been a method generally only available to those with heavy, large and expensive equipment. If one wanted to control the motion of a camera with actions such as panning, tracking or tilting of the camera, the only means to provide the level of precise and finite control necessary for effective time-lapse photography required cumbersome equipment.

Until 1975, the primary medium enabling the recording of photographic information made heavy use of photosensitive chemical layers. Eastman-Kodak upset that paradigm in that year with the inception of the digital camera. Presently, the digital camera stands as a state-of-the-art and ubiquitous visual documentation apparatus. Digital camera related technologies have integrated into a variety of devices including, pocket sized phones, computers, music players and a great many other devices.

Although many developments associated with digital camera related technologies led to inventions that created more affordable and attainable small-form photographic information capture devices, the creation of products enabling the use of these products to create time-lapse photographs, particularly those with added motion did not progress at the pace of the digital camera. The prior art inventions enabling the everyday user to capture such time-lapse sequences miss the mark.

Some prior art provides a purely mechanical solution comprising an everyday rotary timer or similar mechanism. This solution is quite simple and cost-effective. The problem however with such devices is that they enable only a low fidelity control of motion. Furthermore, such mechanical or continuously driven systems cannot pause for long exposure times to adequately execute a long exposure frame often necessary for time-lapse photography. Moreover, such devices are characteristically deficient of allowing customization based on user input.

Currently available electrically powered solutions known in the prior art provide varying fidelity of control and quality of time-lapse motion control. Many of the multitude of problems with the prior art related to programmable motion-controlled time-lapse photography stem from a large, cumbersome form factor. This is due to reasons associated with the enabling technologies and utility of such prior art products. As a result, the units remain too cumbersome and impractical for the common consumer.

Furthermore, such large, cumbersome units require additional stabilizing equipment such as a tripod or other support devices to provide a larger effective footprint. Some prior art devices associated with time-lapse photography provide a higher level of fidelity of control than those of the purely mechanical solutions through utilization of servo-motors. The category of electrically driven motors most commonly used with prior art motion time-lapse photography devices consists of brushless induction motors, DC motors, stepper-motors and servo-motors. Servo-motors, commonly used in high-precision requirement applications such as tight tolerance CNC machines, provide a high level of control and motive fidelity. However, servo-motors require more controlling hardware and have a higher price-point than other electrically driven motive options. As a result the price-point of products employing servo-motors remains prohibitive for many, thusly the majority of the use of such products is limited to professional use.

Prior art in the field of motion controlled time-lapse photography generally exists in a segment that many would consider a professional market segment. This increased price point results from the use of enabling technology such as servo-motors. A servo-motor provides constant feedback by way of an encoder that can provide the controller with an accurate position of the servo-motor via feedback output. Servo-motors exhibit a more reliable and higher-fidelity controlled usage over other electrically powered motive means, however the increased functionality comes at a cost. Although servo-motors enable a higher level of control for the user and time-lapse capture, the use of such a motor leads to a much higher cost in a product incorporating a servo-motor.

A market gap exists for such equipment in the consumer space revolving about the limitations of the enabling technologies available to such devices for consumers. A programmable time-lapse product may utilize servo-motors which is an electrically driven axial motor with internal encoder to communicate its exact position at any given point. Servo-motors require little or no power when they have reached their desired position. Servo-motors also turn back on when disturbed from that position. This allows them to hold position against external forces very efficiently and requiring they power up only when movement occurs, and communicate to the controller accordingly. Resultantly, servo-motors exhibit little to no power consumption to remain axially constrained at any given position, and typically do not exhibit backlash. However the problem with servo-motors is that they remain cost prohibitive and can resultantly drive final retail prices higher than what a standard consumer justifies paying for such enabling technologies. Alternatively, one may provide motive means by way of utilization of a stepper-motor, a brushless DC electric motor that divides a full rotation into a number of equal steps.

Stepper-motors are utilized en lieu of servo-motors in a variety of computer controlled applications. An advantage of stepper-motors, in many applications unrelated to time-lapse photography, is that they are attainable at a consumer-friendly price-point. Part of the reasoning behind this cost differential pertains to a lack of feedback offered by stepper-motors versus the servo-motors. However in use, stepper-motors still provide a consistent, predictable and controllable motion. The problem with stepper-motors, although typically more cost-effective than servo-motors, is that they provide a lower level of control and fidelity of movement. In comparison to servo-motors, a stepper motor must always draw power if the user is concerned about movement caused by external forces.

The use of a lower fidelity motive mechanism such as stepper-motors can prove problematic due imprecise axial control and stability. Similar to a servo-motor, a stepper-motor may receive a command to cause it to step, or rotate. However, in a stepper-motor, no mechanism or feedback loop exists to output a confirmation that proper execution has occurred. This is problematic due to inherent backlash, which is a loss of motion transmission due to gaps or clearance between moving parts, such as meshing gears internal to or external to driving motors.

The inherent backlash described above creates angular instability and allows the drive-system mechanisms such as a stepper-motor, gears or final-drive mechanism to freely rotate. Any amount of free-rotation allowing for unintended movement is undesirable as even movements of 0.1 degrees rotation can be perceived by the human eye. A common solution to such backlash or external forces issues utilizes what many refer to as an "active hold." An active hold requires constant power draw by the stepper-motor. The problems arising from such practice are many. Such problems include the stepper-motor necessarily operating at high temperatures, potentially causing damage to the stepper-motor and other related apparatuses. Furthermore, although an active hold keeps the stepper-motor constrained, it cannot assure the constraint of ancillary drive system mechanisms used in conjunction with a stepper-motor. An active hold solution can produce other undesirable effects including increased power drainage requiring increased battery capacity. In many applications, the required increased battery capacity accentuates weight and size problems.

In addition to backlash problems, when not receiving power, steppers in the prior art remain prone to rotation by external force creating unintended motion under some conditions including a windy environment acting upon a mounted camera. An active hold is sometimes utilized as a solution to this problem as well. Once again, this produces undesirable effects including increased power drainage requiring increased battery capacity. In many applications, the required increased battery capacity accentuates weight and size problems.

Another problem with existing prior art products associated with time-lapse photography stems from the limitation of use regarding multiple degrees of freedom. The prior art does not allow for modularity in the sense that one may not use multiple motion time-lapse photography devices in concert. Furthermore, if a user requires multiple degrees of freedom with regard to motion, the restrictions associated with prior art devices restrict the user to purchase a singular unit enabled for such movement. This results in reduced affordability and potentially reduced usability for users, as many users may choose not to purchase upgrades featuring increased functionality due to costs.

Yet another problem with the prior art devices in the field of the invention stems from non-intuitive device interface, programming and status information. As a result, the prior art requires a period of training and learning to operate a unit. Furthermore the programming of such units sometimes require programming via a computer, further requiring additional equipment and negating any decreased form-factor advantages. Many prior art devices additionally feature integrated programming interfaces, which increase the form factor and cost of such devices.

SUMMARY

A device incorporating embodiments of the invention, is capable of user programmed controlled rotational motion enabling discrete controlled rotational motion and camera control intended for photographic purposes and may be used in concert with a plurality of devices to enable coordinated motion in a plurality of axes. Furthermore the invention may provide utility useful in limiting backlash of drive motors and ancillary drive components. The invention has been conceived in light of the existing problems with the state of the art as identified by the inventor as further discussed herein.

A unit, of cylindrical form factor incorporating embodiments of the invention solves these problems. Said unit comprises elements of an external housing with visual, user and electronic interfaces. Said unit further comprises elements of internal components including an electronic controller with memory and processor, battery pack, a stepper motor, main rotational shaft, plurality of gears, and backlash mitigation mechanism. The conglomeration of said elements enables the user an intuitive and programmable time-lapse enabling device.

REFERENCE NUMBERS IN DRAWINGS

Figure 1:
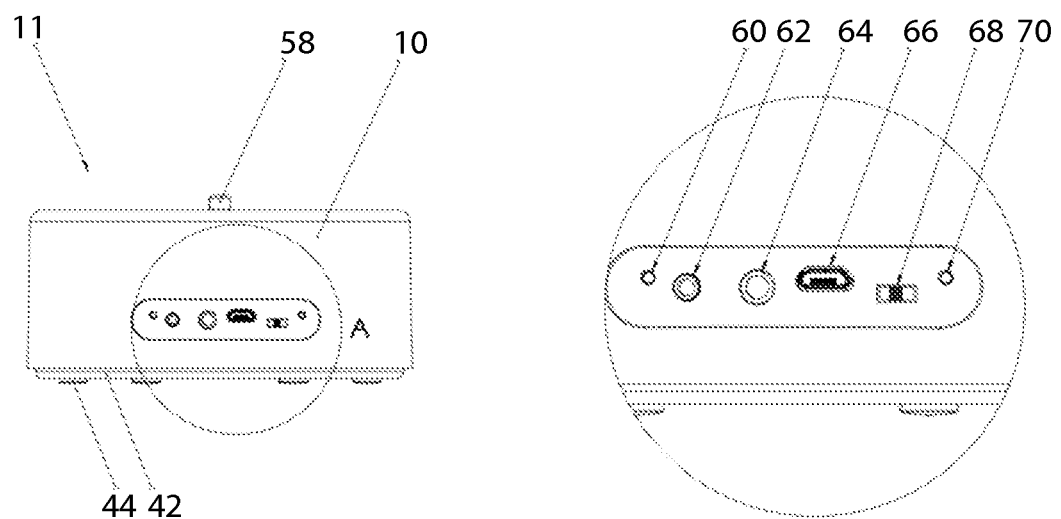
FIG. 1 is a side view of one embodiment of a time-lapse device, with Detail View A of input and output connectors.

10 Main Enclosure Embodiment
11 Device Embodiment
12 Internal Battery Embodiment
14 Foam or Foam Tape Embodiment
16 PCBA Embodiment (Printed Circuit Board Assembly)
18 PCBA Mounting Screw Embodiment
20 Bearing Retaining Washer Embodiment
22 Bearing Retaining Washer Screw Embodiment
24 Backlash Mitigation Membrane Embodiment
26 Bearing Assembly Screw Embodiment
28 Upper Bearing Embodiment
30 Bearing Spacer Shim Embodiment
32 Lower Bearing Embodiment
34 Main Shaft Embodiment
36 Driven Gear Embodiment
38 Base Support Washer Embodiment
40 Base Support Washer Shim Embodiment
42 Base Embodiment
44 Feet Embodiment
46 Panel Nut Washer Embodiment
48 Panel Nut Embodiment
50 Motor Embodiment
52 Motor Screw Embodiment
54 Drive Gear Embodiment
58 Top-Mounting Feature Embodiment
60 Indicator LED I Embodiment
62 Camera Control Port Embodiment
64 Programming Port Embodiment
66 USB Port Embodiment
68 Power Switch Embodiment
70 Indicator LED II Embodiment
72 Camera Embodiment
74 Peripheral Controller Embodiment
76 Adapter Bracket Embodiment
802 Pull-up Resistor Embodiment
804 Pull-down Resistor Embodiment
806 Circuit Supply Voltage Embodiment
808 Controller Signal Reference Voltage Embodiment
810 Controller Signal Voltage Embodiment
812 Device Processor Embodiment
814 Circuit Ground Reference Voltage Embodiment
816 Comparator Embodiment
818 Output Pull-up Resistor Embodiment
901 Spring-back Mechanism Embodiment

DETAILED DESCRIPTION

A commonly accepted method of adding rotational motion in conjunction with time-lapse photography utilizes a purely mechanical solution comprising of attaching a photographic information-recording device to a mechanical rotational device such as an egg-timer. The problem with such a solution arises with a deficiency of allowance for customization based on user input, the inability to halt motion during photography activity, and a potential for a low fidelity motive control. The preferred embodiment of the invention solves this problem and a variety of other related challenges.

It will be appreciated by one skilled in the art that the term "camera" as used herein refers to any apparatus enabling the capture or recording of visual images, including but not limited to still cameras, video cameras and other image capture devices.

Furthermore, it will be appreciated by one skilled in the art that the term "motion time-lapse photography device," as used herein, refers to devices enabling motive capability in a rotational or transversal manner in the context of photography. Although such devices enable such motive capability in the context of photography, the use of such motive capabilities is not mandatory. Embodiments incorporating principles of the invention utilize a motion time-lapse photography device that enables the control of a camera in association with the execution of a series of photographs in sequence.

Further still, it will be appreciated to one skilled in the art that a 'powered' device may derive said power from a variety of internal or external power sources including but not limited to batteries, wired AC or DC power, photovoltaic, and fuel-cell generated power.

A motion time-lapse photography device embodying the principles of the invention comprises a motor, power source and controlling circuitry enables a user to couple said motor to a photographic capture device, herein referred to as a camera, to enable the finite control providing programmable motion-control rotational motion per the input of the user. This embodiment solves the problems associated with mechanical rotational devices by allowing for user customization while offering the potential of increased motive fidelity.

A motor, as defined herein, is an apparatus that provides motive power by way of converting energy, such as electrical or combustion derived, to enable motion of associated components.

The associated control of such motion time-lapse photography devices typically includes utilization control hardware including a simple circuit providing a means or method of connecting to a power source and/or disconnecting from a power source. The control hardware used further includes more complex circuits and enables the interface and programming of motive control. Furthermore, it will be appreciated by one skilled in the art that such control may include the control of motive mechanisms as well as ancillary components such as a camera and my be accomplished by means commonly known to those skilled in the art.

A problem associated with prior-art motion time-lapse photography enabling devices is that they require a large and cumbersome form-factor requiring a tripod or other stabilization apparatus. This problem is solved by a device embodying principles of the invention comprised of a main enclosure shell containing parts to provide rotational motion. In the preferred embodiment motion is provided axial to the main enclosure 10 with a top-mounting feature for the intended purpose of attaching to a camera or other related image capture device. In the preferred embodiment, the base 42 of the device remains static to a supporting surface, while the main enclosure 10 and any parts therein rotate independently of the base 42 providing rotational motion to any mounted camera. This base 42 provides a substantially flat and amply sized footprint to enable the use of the invention independent of a tripod or similar apparatus. As used herein, an "amply sized footprint" refers to an area enclosed by the contact points or area of the base that provides contact with a surface beyond the lateral extent of the center of gravity of the combined use of the device and a photographic capture device such as a camera with extended lens. In the preferred embodiment, the amply sized footprint contacts the surface of a supportive mass such as a table-top, moving supportive mass, rotating supportive mass, supportive mass designed to traverse rails, platform affixed to a wheeled vehicle, ground or other bodies organic and inorganic.

Further within the preferred embodiment, a motion time-lapse photography device may include a mounting provision, accessible via the base to enable the use of the device in conjunction with a tripod or similar apparatus. Furthermore, the embodiment may provide an intermediate layer or feet to provide added lateral constraint to the unit when in use without a tripod. Such lateral constraint may be provided by means of rubberized feet, suction cups or other commonly accepted mechanisms providing increased lateral constraint. An embodiment of the invention incorporates rubberized feet 44, intended for attachment by a user, as shown in FIG. 1.

Figure 2:
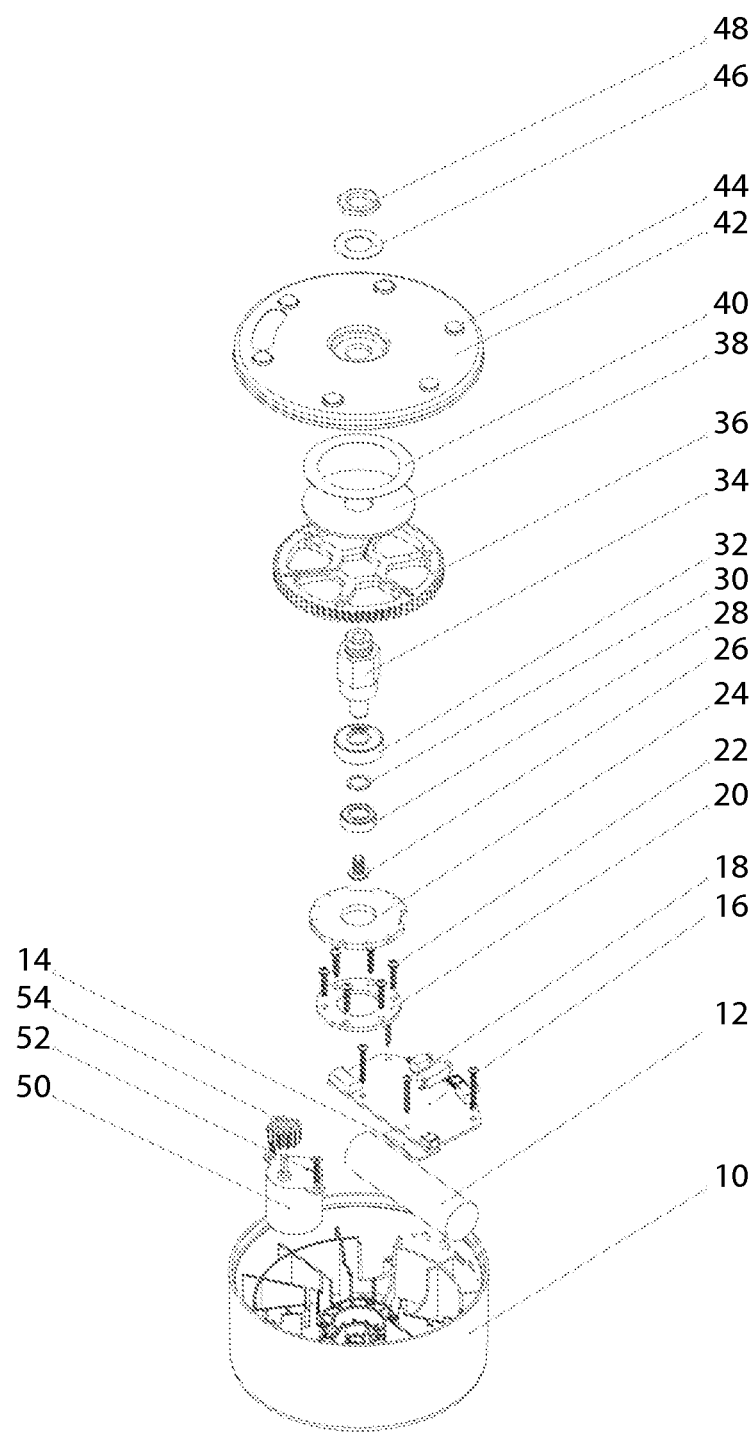
FIG. 2 is an exploded perspective view of various components of one embodiment of a time-lapse device.

In some embodiments the base 42 may be comprised of a plurality of independently rotating concentric pieces of substantially circular perimeter. In the preferred embodiment, the base is a singular part with substantially planar base and nests concentrically within the recess provided by the main enclosure 10 as indicated in FIG. 2. In an embodiment of the invention, the base 42 contacts a planar surface without said planar surface contacting the main enclosure 10. In such embodiment, because planar surface does not directly come into contact with the main enclosure 10, but instead contacts base 42, a user may effectively use the device without a tripod. The design of the preferred embodiment of the invention allows for rotation of the main enclosure 10 about one concentric axis, while the base 42 remains static in relation to the planar surface.

The problem with products in the existing prior art surrounding the size limitations of such products requiring a tripod or other stabilization apparatus is solved by a device embodying the principles of the invention as shown in FIG. 1. A device 11 features a main enclosure 10 with closed top and open base as well as internally concentric nesting base 42 with flat bottom. The exterior features of the device may include a top-mounting feature 58. In the preferred embodiment the main enclosure comprises a substantially cylindrical form with a male threaded stud of thread size ¼-20 or ⅜-16 per ANSI/ASME B1.1-2003, protruding from the center of the main enclosure 10. Furthermore the device 11 may include a bottom mounting feature. In the preferred embodiment, a female threaded hole of size ¼-20 or ⅜-16 per ANSI/ASME B1.1-2003 comprises the bottom mounting feature and may be used with a tripod or other platform to provide additional stability. In other embodiments, the top and bottom mounting features may comprise of different thread sizes, and furthermore may comprise of attachment mechanisms appreciated by one skilled in the art.

Figure 3:
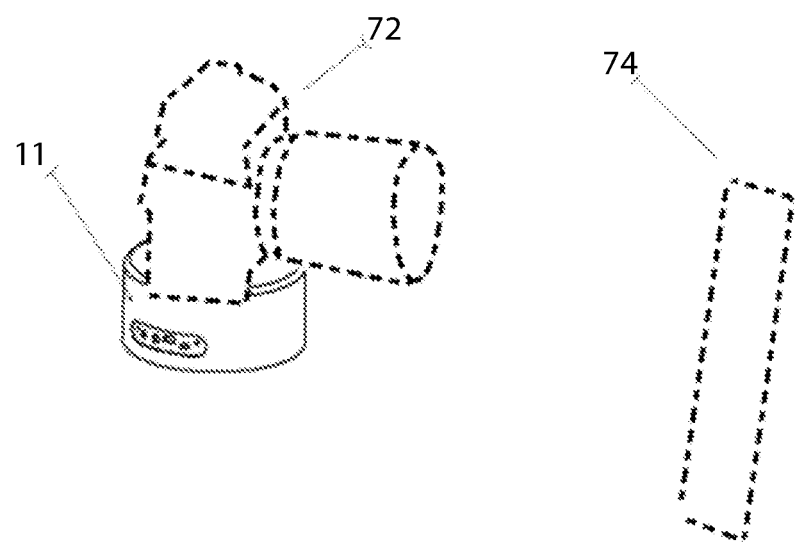
FIG. 3 shows one embodiment of a device operating in conjunction with a peripheral control device and a camera.

The exterior of the device in the preferred embodiment, as demonstrated in FIG. 3, includes an interface panel intended for communication, interaction or control between the device and a user, peripheral controller 74 or camera 72 interface. Furthermore, the internals of the unit comprise a plurality of components enabling the interface, programming, power and movement of the device. In an embodiment of the invention, these internal components are comprised of an internal battery, Printed Circuit Board Assembly (PCBA), motor which may comprise of a stepper motor with any necessary ancillary drive gears, and plurality of other enabling retention and motion enabling parts such as screws, washers, bearings and backlash mitigation mechanism.

The problem of backlash inherent in more cost-effective motive drive mechanisms and ancillary parts, such as stepper-motors, is solved by a device 11 embodying the principles of the invention as shown in FIG. 2. A backlash mitigation mechanism provides rotational resistance and rotational force to prevent or reduce free-rotation resultant from inherent backlash in the motor 50 and ancillary drive components. Furthermore, the backlash mitigation mechanism may provide a rebound property comprising of an internal mechanism, motor-driven response or inherent elasticity of materials to provide rotational force counter to the rotation of the device 11 when in use. In a preferred embodiment, a stepper-motor comprises the motor 50 to which drive gear 54 mounts. The drive gear 54 mates to driven gear 36, which in turn drives the main shaft 34. The main shaft 34 remains constrained in place by a combination of a lower bearing 32, a bearing spacer shim 30, upper bearing 28, bearing assembly screw 26, bearing retaining washer 20 and bearing retaining washer screw 22. In addition to these components exhibited by embodiments of the invention, exists a backlash mitigation mechanism intended to reduce the shortfalls of a stepper motor with regard to inherent backlash and may also extend to mitigate backlash in ancillary drive gears. In the preferred embodiment, the backlash mitigation consists of a membrane (also referred to herein as a "backlash mitigation membrane") 24 providing axial rotational friction resistance directly to the main shaft 34, which provides final motive drive to the device 11. It will be appreciated by one skilled in the art that "membrane" refers to a thin, pliable sheet of material. This resistance provides restriction to hold the unit in a configuration such that all gears internal and external to the motor 50 are held in direct contact with each other thereby eliminating free movement and reducing or eliminating, the problematic backlash. Furthermore, within the preferred embodiment, a flexible rubber membrane of approximately 3.175 mm (0.125 inches) thickness comprises the backlash mitigation membrane 24 and is held in place to rotate in concert with the main enclosure 10 by a series of slits, extending through the thickness of the material substantially normal to the perimeter. These slits coincide with stiffening features inherent in the preferred embodiment of the main enclosure 10. The backlash mitigation membrane 24 further features an aperture through which the main shaft 34 protrudes. This aperture in the backlash mitigation membrane 24 provides a tight fit designed to provide frictional resistance and counter-rotational force to counteract the free-movement of not only the stepper motor 50 but also movement of ancillary driven system parts due to backlash.

In an alternate embodiment of the invention, the backlash mitigation mechanism may be utilized elsewhere in conjunction with moving components or interface between static and moving components to provide device 11 a reduction in free-movement due to backlash. Furthermore, a plurality of backlash mitigation mechanisms may be used throughout device 11.

The problem of external forces, including wind acting on an attached photographic capture device 72, is solved in an embodiment which includes one or more backlash mitigation mechanisms to provide resistance not only to reduce gear lash but to also reduce unintended movement. In such an embodiment, the integrated backlash mitigation mechanism provides resistance to counteract not only free-movement of motor 50, in this case a stepper, but also to provide increased resistance not to exceed the resultant torque equal to that of the active torque value of said motor 50. This solves the movement problem of the stepper and ancillary parts without the increased power draw, motor temperature or power needs associated with an active-hold.

In a further embodiment, said backlash mitigation mechanism comprises flexible materials such as a rubber, polymers or other enabling compounds in a multitude of forms not limited to thin membrane or sheet form. Furthermore said backlash mitigation mechanism may also take the form of a mechanical mechanism, electro-mechanical mechanism, magnetic mechanism or other enabling mechanism appreciated by one of ordinary skill in the art.

In a further embodiment in accordance with the principles of the invention, the device 11 may execute a series of movements in order to bring moving components together to account for backlash caused by clearance between such motion enabling parts such as motors and gears. Furthermore, such movements may act to engage a passive solution intended to reduce backlash inherent in motion enabling parts.

In such an embodiment of the device 11 as provided in FIG. 2, the firmware of the PCBA 16, which may be updated via the USB port 66, directs the motor 50 through a series of movements to take up the slack in the system and engage a backlash mitigation mechanism. In this embodiment the parts exhibiting backlash include the motor 50, the drive gear 54 and driven gear 36. In order to take up the clearance between moving parts due to backlash, the PCBA 16 may direct the motor to operate counter to intended rotation during use prior to turning back toward the intended direction. For example, if the device 11 has the intended and programmed direction to operate in a clockwise rotation, the PCBA 16 may direct the motor 50 to operate counterclockwise for a predetermined angle prior to operating clockwise an equal or greater angular amount to come to rest at a starting point or home position. In the preferred embodiment, the PCBA 16 may direct the motor 50 to operate counter-clockwise for an angular displacement of 6 degrees prior to operating in a clockwise fashion for 6 degrees but preferably 8 degrees to ensure full engagement and preloading of the backlash mitigation membrane 24 providing counter-rotational force to the main shaft 34 through frictional resistance. In other embodiments, angular displacement executions may be set and modified by a user to account for variation of manufacture tolerances in a stepper motor, gears or other ancillary drive components.

Furthermore, such series of movements within the preferred embodiment act to elastically deform the backlash mitigation mechanism, which in an embodiment of the invention comprises a membrane 24. The membrane, as used in the preferred embodiment of the invention, as a result of inherent elastic properties, is constantly inclined to return to a state of equilibrium. When said membrane is impeded from doing so, as a result of frictional resistance applied to the main shaft 34, this provides a reactionary rotational force providing an increased level of constraint, further engaging drive components comprised of motors and gears.

Figure 15:
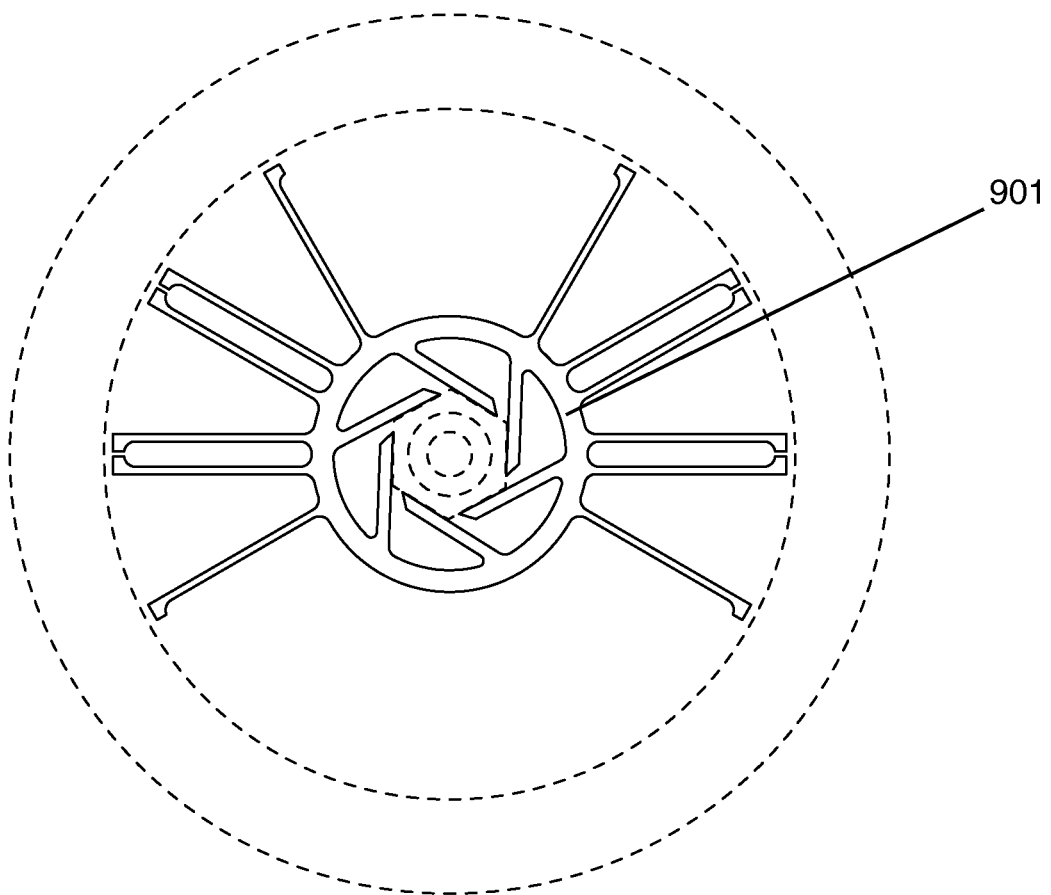
FIG. 15 shows an alternative embodiment of the spring-back mechanism.

In other embodiments of the invention, the backlash mitigation mechanism comprises of a spring-back mechanism 901 as shown in FIG. 15 comprised of an internal frictional piece, which acts upon an axially rotating motive component to provide frictional resistance. Furthermore the constraint of this spring-back mechanism 901 may attach to the main enclosure with radially extending arms designed to deflect under load, providing a reactionary rotational force to provide an increased level of constraint, further engaging drive components comprised of motors and gears.

The problem associated with products in the prior art surrounding time-lapse photography lacking an intuitive programming and usage interface is solved by an embodiment of the invention providing an interface panel that includes inputs, outputs, visual indicators and power control. In the preferred embodiment as in FIG. 1, the exterior housing of the time-lapse device features an interface panel comprised of two indicator LED lights, a camera control port 62, a programming port 64, a USB port 66, and a power switch 68. In use, a user activates the device by means of a power switch 68 in preparation to utilize the unit.

In another embodiment of the invention, upon power activation the power status and battery level may be communicated to the user. The power level is relayed to the user by means of indicator LED I 60 which has the capability to display a plurality of colors. In the preferred embodiment, one blink of green indicates one-third of full charge on internal battery 12, two blinks of green indicates two-thirds of full charge on internal battery 12, and three blinks of green indicates full charge on internal battery 12. In such embodiment, any number of red blinks indicates a low state of charge on internal battery 12.

In yet another embodiment, a camera 72 or other photographic device is affixed to the top-mounting feature 58. In such embodiment, an cable extending between the camera 72 control port and the camera control port 62 connects the two ports. The user may upload a program to the device in such embodiment by way of a peripheral controller 74, comprised of a smart phone or other small computing device, through an application taking the user's input and converting it to a standardized format for transmittal to the device 74 via port 64 or any other wired or wireless protocol. In the preferred embodiment this communication occurs through programming port 64 comprised of a 3.5 mm barrel audio jack.

Figure 11:
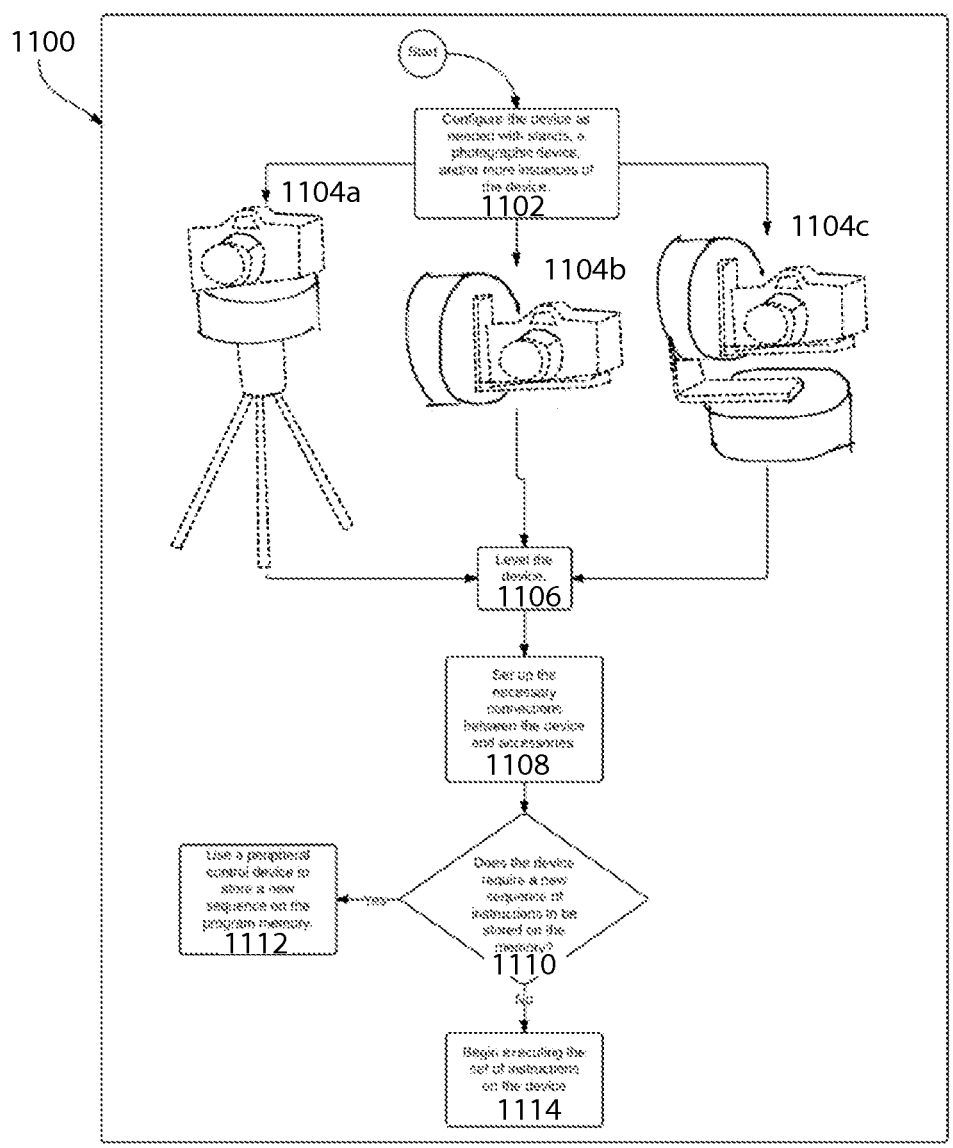
FIG. 11 shows one embodiment of a method used to captures a generic time-lapse sequence.
Figure 12:
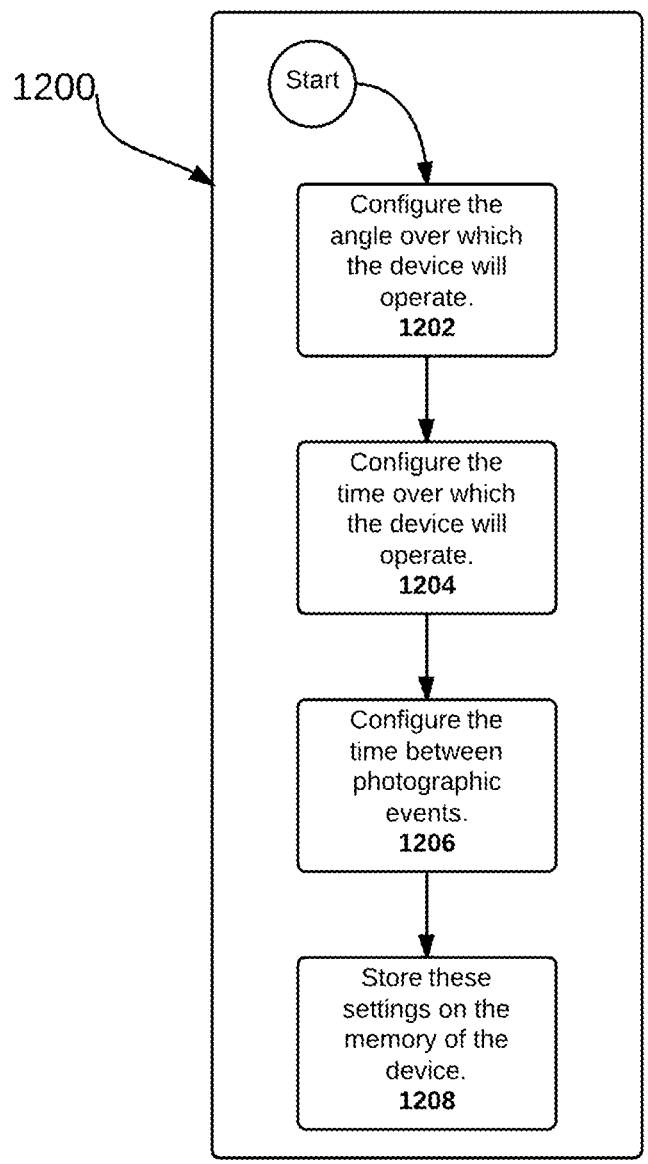
FIG. 12 shows one embodiment of a method for configuring a sequence of events to be stored on an embodiment of a time-lapse device.
Figure 13:
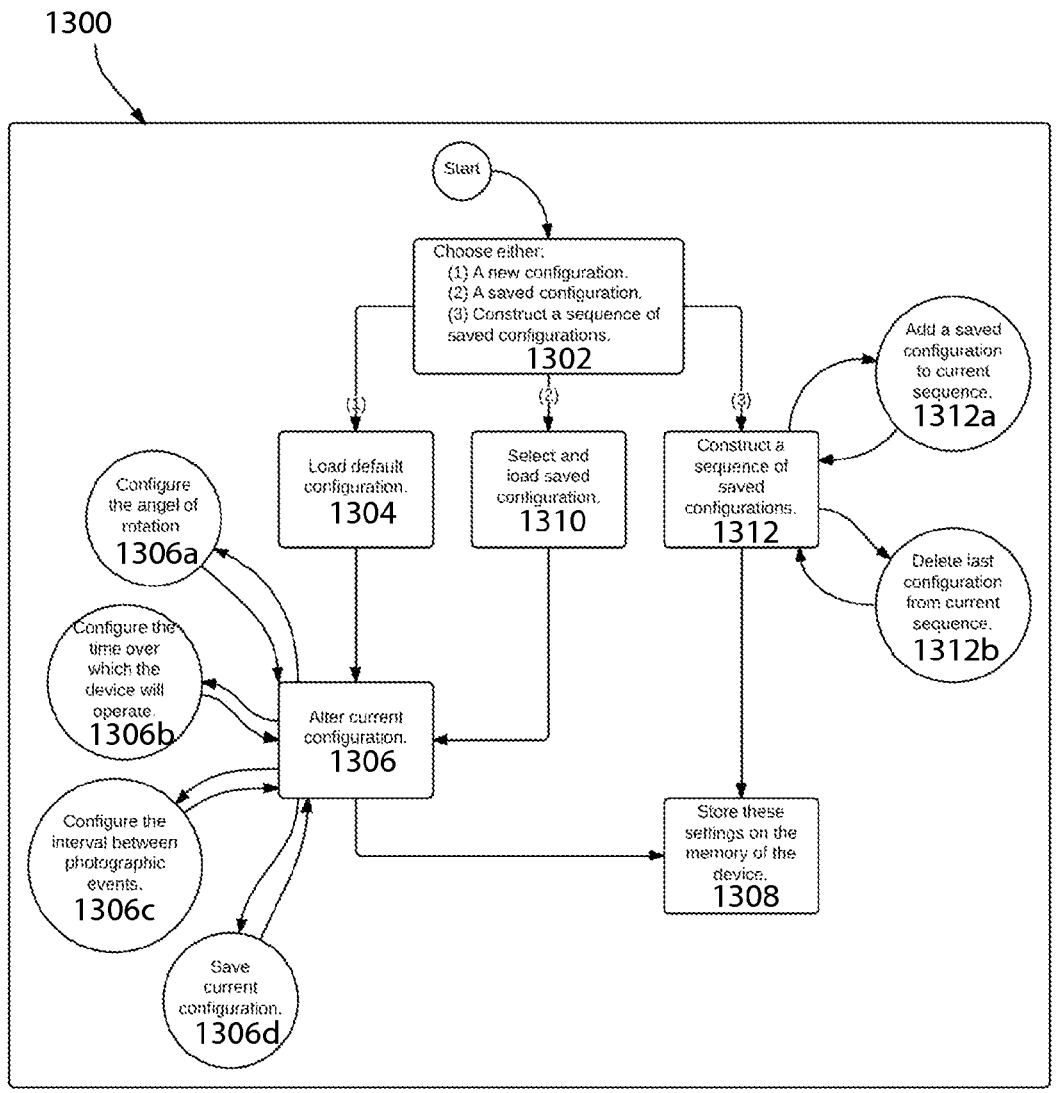
FIG. 13 shows an alternate embodiment of a method for configuring a sequence of events to be stored on an embodiment of a time-lapse device.
Figure 14:
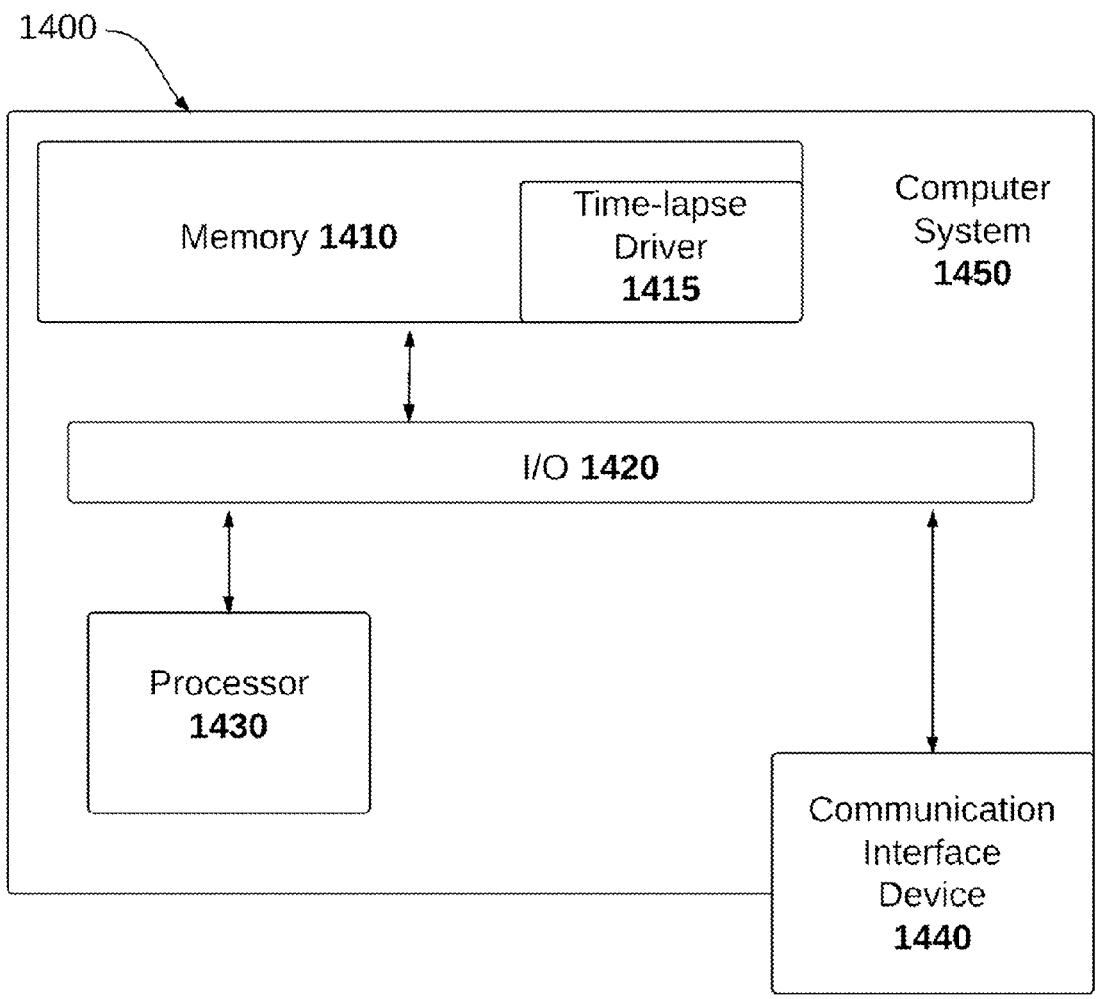
FIG. 14 is a block diagram of one embodiment of an exemplary computer system.

Furthermore, in the preferred embodiment, the last programmed executable motion control uploaded to the device 11 is held in memory 1410, as indicated in FIG. 14. In the event the device 11 is activated with a power switch 68 and a new executable file is not uploaded, as indicated by FIG. 11 at decision point 1110, the controlling firmware executes the sequence of instructions as stored in memory 1410.

Further still within the preferred embodiment, this execution of stored sequence of instructions occurs after a period of time consistent across all devices to allow for simultaneous and coordinated movements between a plurality of devices. In other embodiments, this period of time may be modified by the user.

In other embodiments of the inventions, the invention may utilize wired or wireless communication between a plurality of devices in use for coordinated synchronous movement.

In yet another embodiment of the invention, indicator LED II 70 conveys the status of the unit. Indicator LED II 70 also can display several colors and may blink or turn on to indicate that the device is communicating with other devices via programming port 64 or camera control port 62. For example, this blinking may indicate communication to a photographic device or a peripheral controller device. In the preferred embodiment, indicator LED II blinks green once to indicate active motion of the device 11. Once the user has uploaded a program, the camera 72 attached to the top-mounting feature 58 is connected via an appropriate cable extending between the camera 72 control port and the camera control port 62. Once the communication to the peripheral controller 74 is terminated the device 11 begins execution of the uploaded program. Upon the completion of said program, the unit ceases movement and may indicate such status by means of Indicator LED II 70. In an embodiment of the invention, the interface panel includes an activation button to enable the user to communicate to the device at the moment it is to begin execution of an uploaded program.

Figure 4:
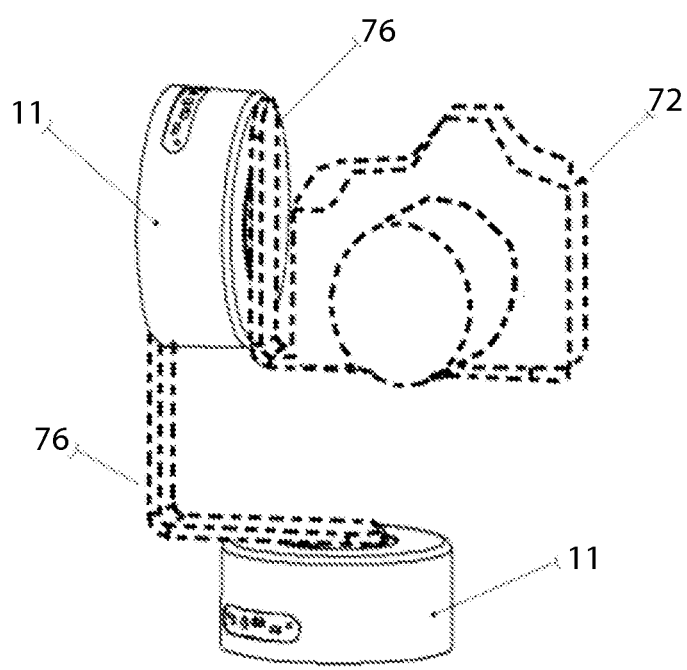
FIG. 4 shows two embodiments of a time-lapse device being used in conjunction with one another for multi-degree of freedom control.
Figure 5:
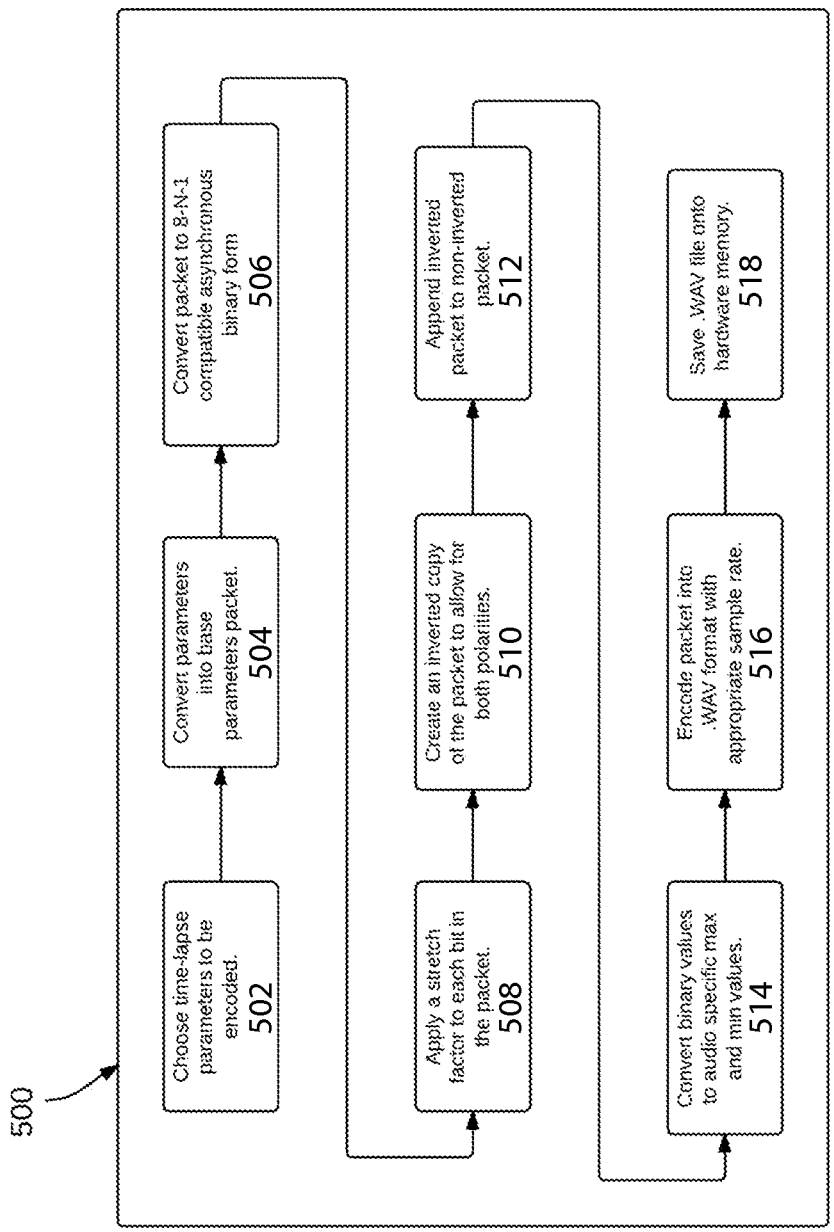
FIG. 5 shows one embodiment of a method, used to create a data packet that is sent by a controller to a device.
Figure 6:
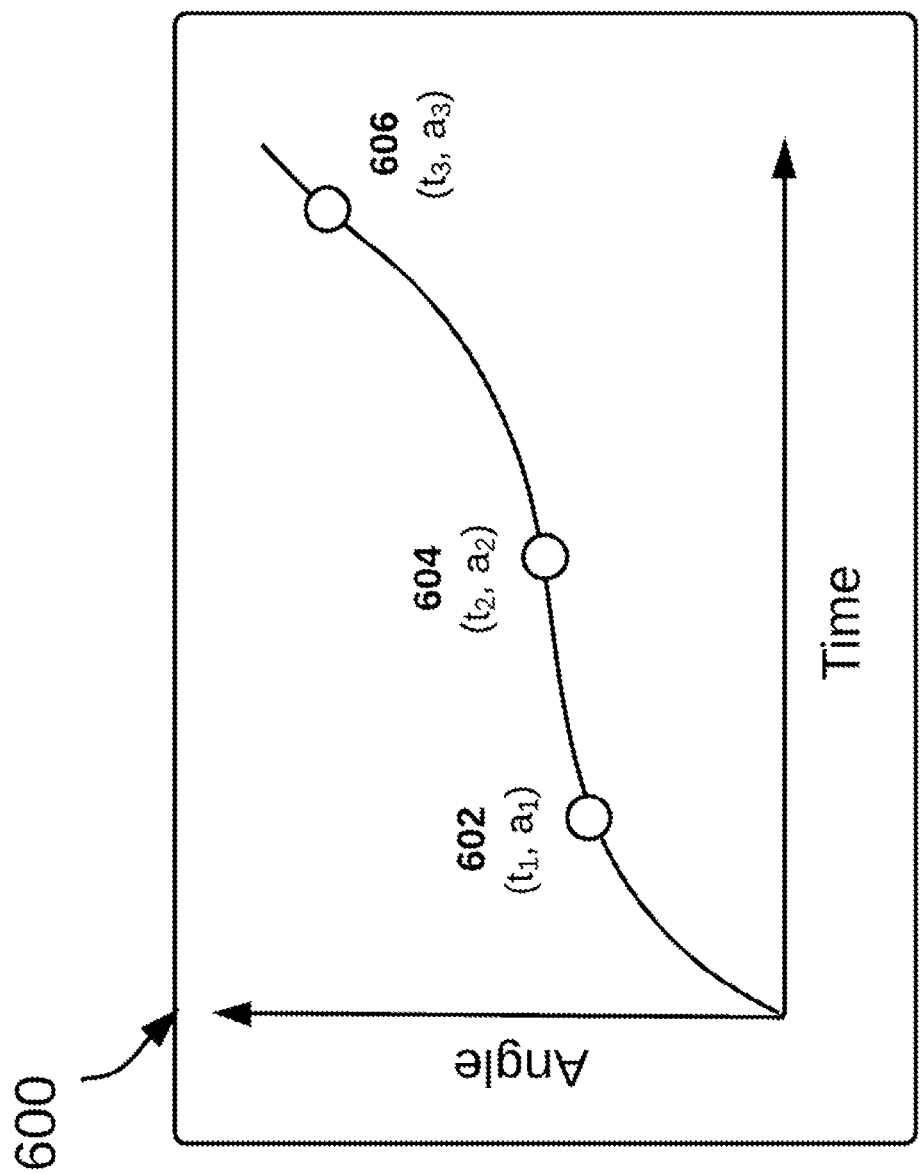
FIG. 6 shows the Speed Ramping interface on the controller side.
Figure 7:
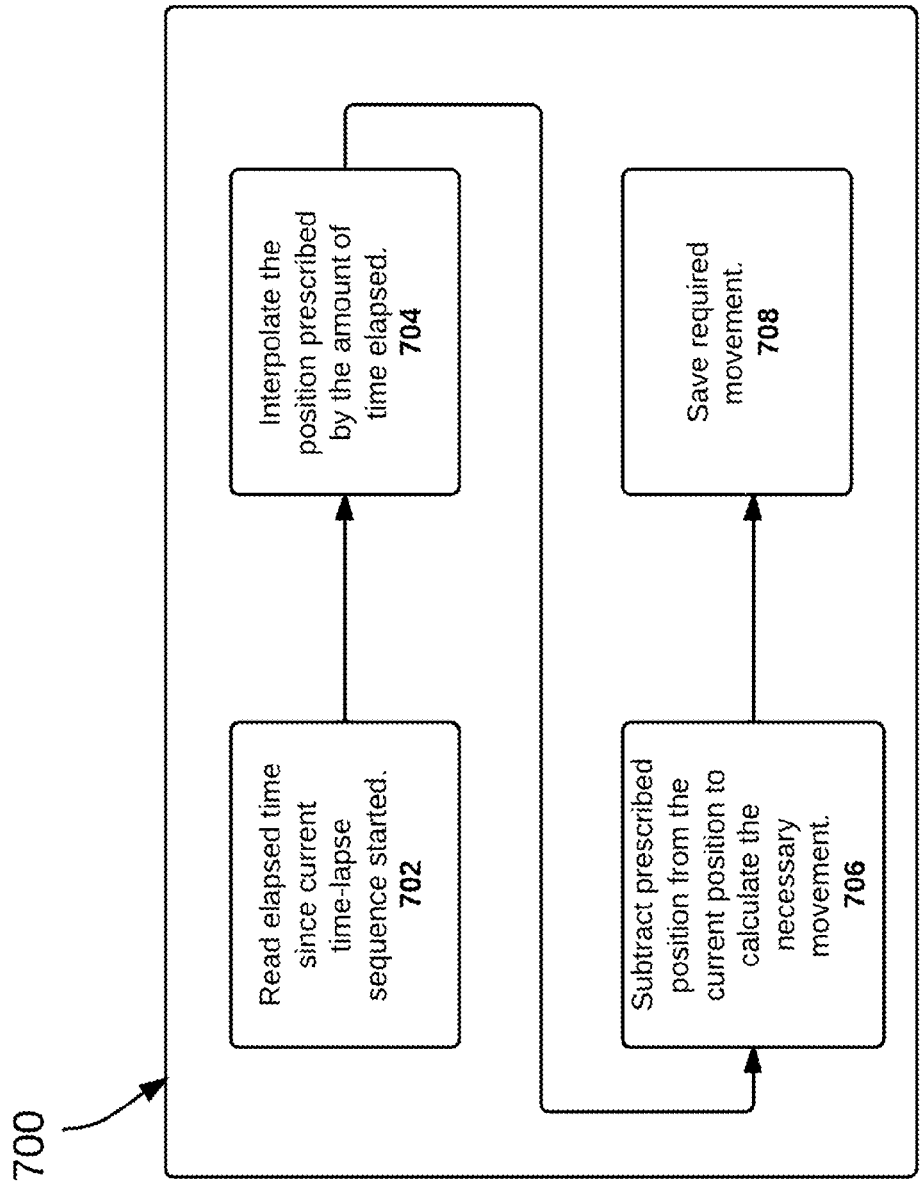
FIG. 7 shows the process by which the device computes the amount to rotate based on speed ramping settings.
Figure 8:
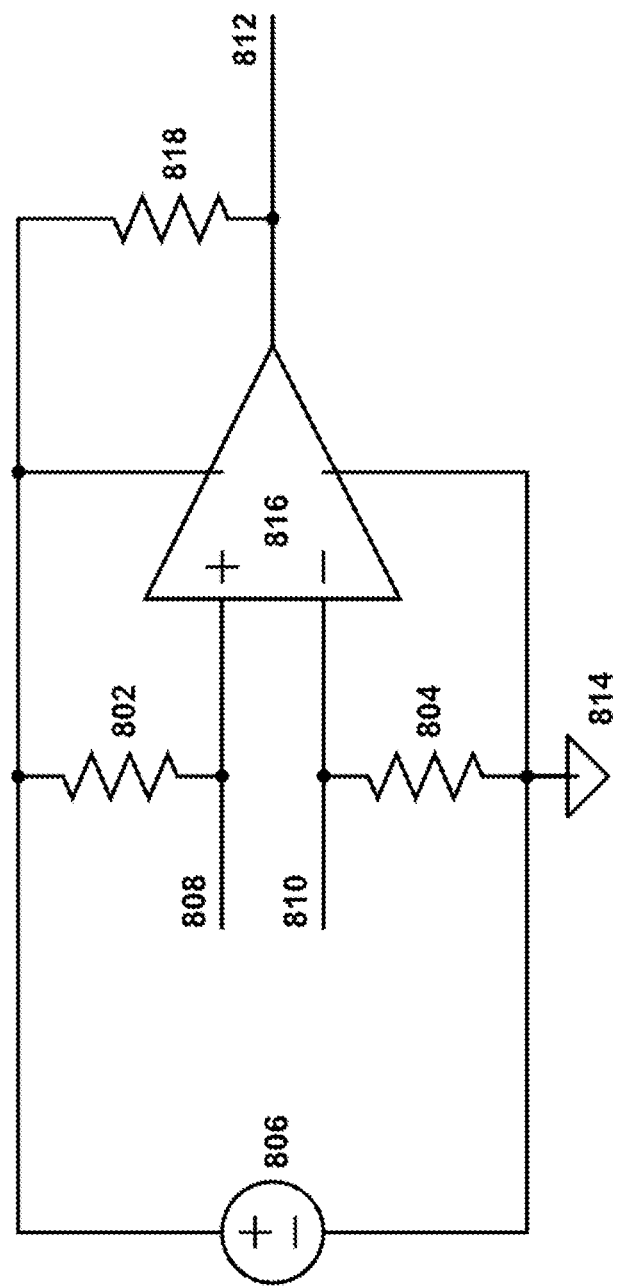
FIG. 8 shows a comparator circuit used to condition an incoming signal in one embodiment of a time-lapse device.
Figure 9:
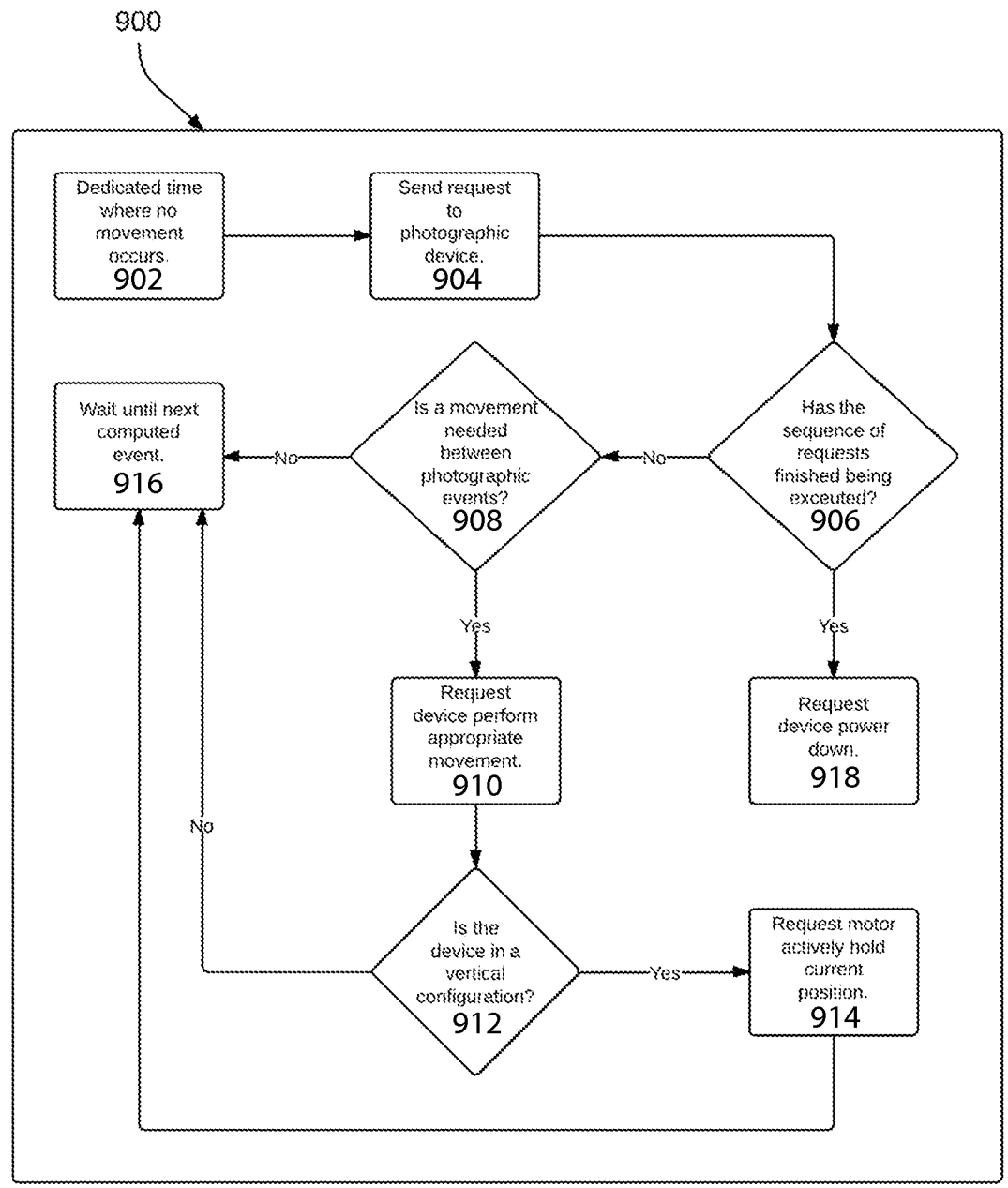
FIG. 9 shows one embodiment of a method by which the device is able to progress through a motion time-lapse sequence.
Figure 10:
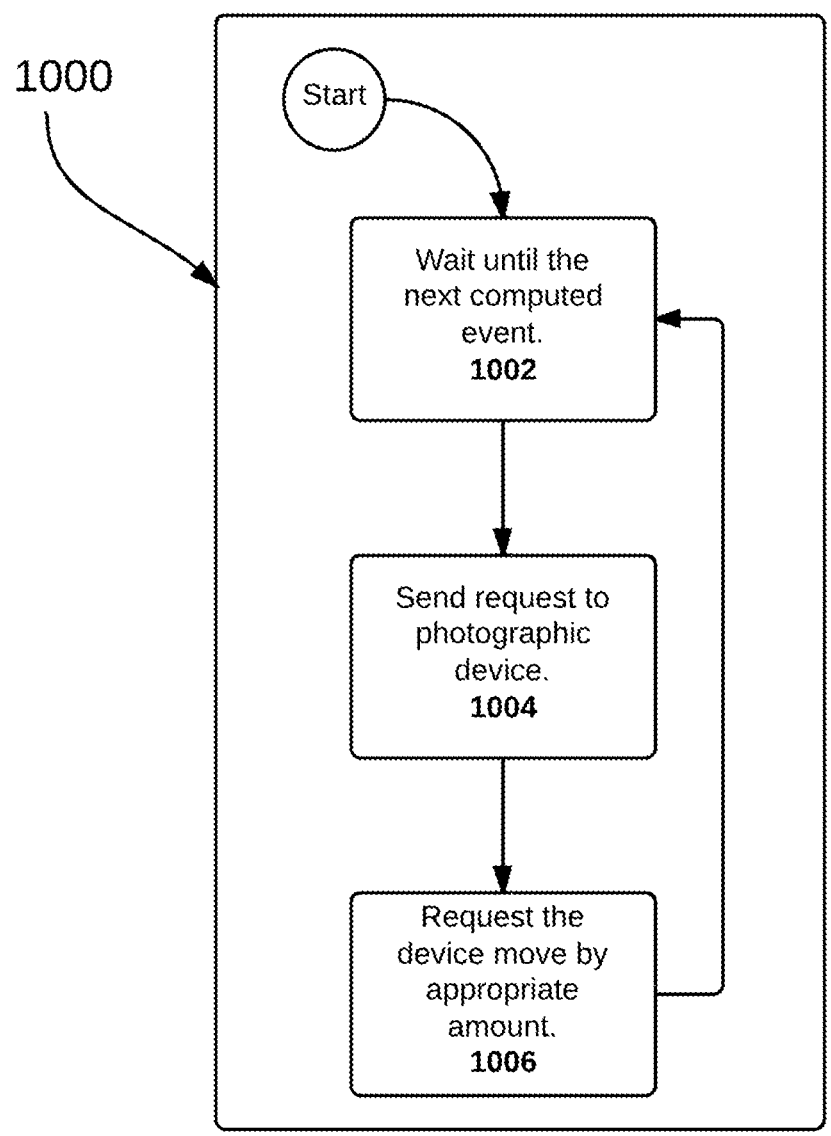
FIG. 10 shows another embodiment of a method by which the device is able to progress through a motion time-lapse sequence.

The problem surrounding products enabling coordinated motion involving multiple degrees of freedom and modularity between independent devices is solved by an embodiment of the invention capable of use with other units. A user may couple a plurality of units and enable multiple degrees of freedom by way of structural connection. In the preferred embodiment as demonstrated in FIG. 4, two specimens of device 11 connect mechanically by 90-degree adaptor bracket 76. The first specimen of device 11, referred to as the primary unit, with the adaptor bracket affixed to the top-mounting feature 58. At the distal end of the bracket, a second specimen of device 11, herein referred to as the secondary unit, is affixed utilizing the secondary unit's bottom mounting.

Furthermore within the preferred embodiment, an additional instance of adaptor bracket 76 is affixed to the bottom mounting feature incorporated into the main shaft 34. Further still within the preferred embodiment, a second adaptor bracket 76 mounts to the top-mounting feature 58 of the secondary unit at the distal end of which a camera may be affixed.

Furthermore, in the preferred embodiment, the last programmed executable motion control uploaded to the device 11 is held in memory 1410, as indicated in FIG. 14. In the event the device 11 is activated with a power switch 68 and a new executable file is not uploaded, as indicated by FIG. 11 at decision point 1110, the controlling firmware executes the sequence of instructions as stored in memory 1410.

Further still within the preferred embodiment, this execution of stored sequence of instructions occurs after a period of time consistent across all devices allowing for simultaneous and coordinated movements between a plurality of devices as devices intended to work in concert are activated simultaneously or near-simultaneously. In other embodiments, the user may modify the length of such period of time.

In other embodiments of the inventions, the invention may utilize wired or wireless communication between a plurality of devices in use for coordinated synchronous movement.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The descriptive labels associated with the numerical references in the figures are intended to merely illustrate embodiments of the invention, and are in no way intended to limit the invention to the scope of the descriptive labels.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

We claim:

1. A motion time-lapse photography device comprising:
   a main enclosure having a substantially cylindrical form, said main enclosure having ribs projecting inwardly from the interior surface of said main enclosure, a closed end with a fastening feature at said closed end, and an open end opposite said closed end;
   a base portion connected to said main enclosure, creating an outer surface opposite said closed end of said main enclosure, exhibiting an axis of rotation oriented substantially parallel to the central axis of said main enclosure;
   a drive train comprising a drive motor, a drive gear and a driven gear, wherein said drive motor is affixed to the interior of said main enclosure;
   said driven gear affixed coaxially with said base portion;
   said drive motor and said drive gear engaging through said drive train to create rotational movement between said main enclosure and said base portion;
   a main shaft attached to said base portion wherein said main shaft is coaxial and rotationally constrained with said driven gear and protruding through an aperture of a flexible backlash mitigation mechanism;
   said flexible backlash mitigation mechanism located external to said drive motor;
   said flexible backlash mitigation mechanism further comprising slits; and
   said aperture providing frictional resistance to said main shaft and slits interfacing with said ribs, whereby backlash between said drive gear and said driven gear is mitigated.

2. The motion time-lapse photography device of claim 1, wherein said drive motor consists of a stepper-motor.

3. The motion time-lapse photography device of claim 1, wherein said base portion remains static in relation to a supportive mass while said enclosure and any parts therein rotate independently from said base.

4. The motion time-lapse photography device of claim 1, wherein said motion time-lapse photography device enables the capture of a sequence of photographs at an interval in coordination with axial movement in at least one rotational degree of freedom of a photographic capture device attached to said motion time-lapse photography device.

5. The motion time-lapse photography device of claim 1 wherein said flexible backlash mitigation mechanism comprises rubber.

6. The motion time-lapse photography device of claim 5, wherein said flexible backlash mitigation device comprises a thickness of 3.175 millimeters (0.125 inches).

7. The motion time-lapse photography device of claim 1 wherein said backlash mitigation mechanism comprises a spring-back mechanism, said spring-back mechanism comprising an aperture and radially extending arms, said radially extending arms deflecting under load wherein said radially extending arms provide a reactionary rotational force to mitigate backlash in said drivetrain.

8. The motion time-lapse photography device of claim 1 wherein said motion time-lapse photography device may be threadably affixed to a tripod.

9. The motion time-lapse photography device of claim 1 wherein the center of mass of an assembly comprising of said motion time-lapse photography device and an attached image capture device lies within the bounds defined by rays projecting vertically from the perimeter of said base portion.

10. The motion time-lapse photography device of claim 1 wherein said driven gear is integrated with said base portion.

11. A motion time-lapse photography device comprising:
    a main enclosure comprising integrated stiffening features, said main enclosure having an open end and a closed end opposite said open end, and a fastening feature at said closed end;
    a base portion connected to said main enclosure, creating an outer surface opposite the closed end of said main enclosure, said base portion exhibiting an axis of rotation oriented substantially parallel to the central axis of said main enclosure;
    a drive train comprising a drive motor, a drive gear and a driven gear, said drive motor being affixed to the interior of said main enclosure;
    said driven gear affixed coaxially with said base portion;
    said drive motor driving and said drive gear engaging through said drive train to create rotational movement between said main enclosure and said base portion;
    a main shaft attached to said base portion wherein said main shaft is coaxial and rotationally constrained with said driven gear and protrudes through an aperture of a flexible backlash mitigation mechanism;
    said flexible backlash mitigation mechanism further comprising mating features and located external to drive motor;
    said aperture of said flexible backlash mitigation mechanism providing rotational resistance to said main shaft; and
    said mating features interfacing with said stiffening features, whereby backlash between said drive gear and said driven gear is mitigated.

12. The motion time-lapse photography device of claim 11 wherein said drive motor comprises a stepper motor.

13. The motion time-lapse photography device of claim 11 wherein said backlash mitigation mechanism is composed of a material selected from the group consisting of plastic or rubber.

14. The motion time-lapse photography device of claim 11 wherein said motion time-lapse photography device may be threadably affixed to a tripod.

15. The motion time-lapse photography device of claim 11 wherein the center of gravity of an assembly of said motion time-lapse photography device and an attached image capture device lies radially within any ray projecting vertically from the perimeter of said base portion.

16. The motion time-lapse photography device of claim 11 wherein said driven gear is integrated with said base portion.

* * * * *